United States Patent

[11] 3,581,759

[72] Inventor Charles Clifford Veale
 950 Canyon View Drive, Laguna Beach, Calif. 92651
[21] Appl. No. 642,285
[22] Filed May 23, 1967
[45] Patented June 1, 1971
 Continuation-in-part of application Ser. No. 541,422, Mar. 7, 1966, now Patent No. 3,322,342.

[54] CONTROL MEANS FOR PROPORTIONING AND MODULATING FLUID FLOW RATES TO REGULATE PRESSURES AND TEMPERATURES
 18 Claims, 7 Drawing Figs.
[52] U.S. Cl. .................................................. 137/101.19, 236/12
[51] Int. Cl. ............................................................ G05b 11/01
[50] Field of Search ............................................. 137/101.19, 3, 115; 236/69, 12 X

[56] References Cited
 UNITED STATES PATENTS
 2,410,335 10/1946 Burdick ........................ 137/3
 3,322,342 5/1967 Veale ........................... 236/69X Primary Examiner—William F. O'Dea
Assistant Examiner—William H. Wright
Attorney—Nienow & Frater ABSTRACT: The invention covered in this application comprises a fluid pressure and temperature-sensing means for regulating preset pressure and temperature levels. U.S. Pat. No. 3,322,342 includes an electrical control and sensing system, coupled to a fluid flow rate modulating valve means. This invention, covered by Ser. No. 642,285, modifies said electrical system and valve to provide more precise flow rate control and better mixing principle for proportioned fluid flows. This invention also outlines a fully hydraulic fluid flow bridge which can be used in any hydraulic system where a modulated or servo-type movement is required from a remote control station, and for simple control applications or purposes of registration. Nonelectrical pressure and temperature-sensing means also are provided in said fluid flow control bridge. The systems also include flow rate proportioning means, having sensor-controlled rate-modulating means.

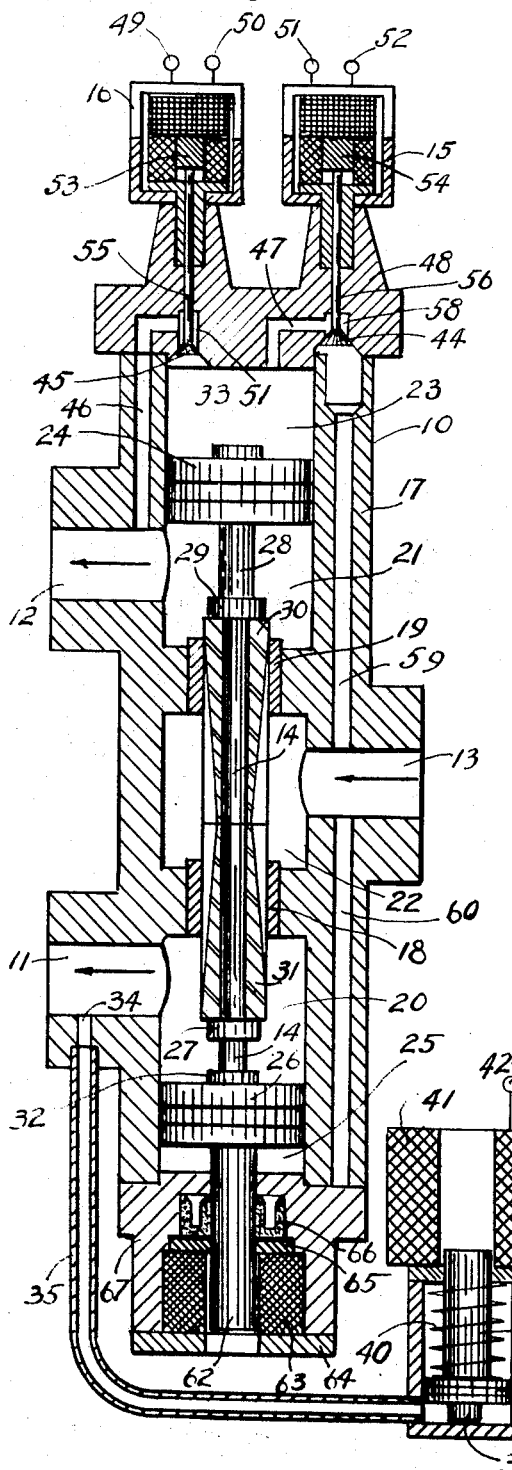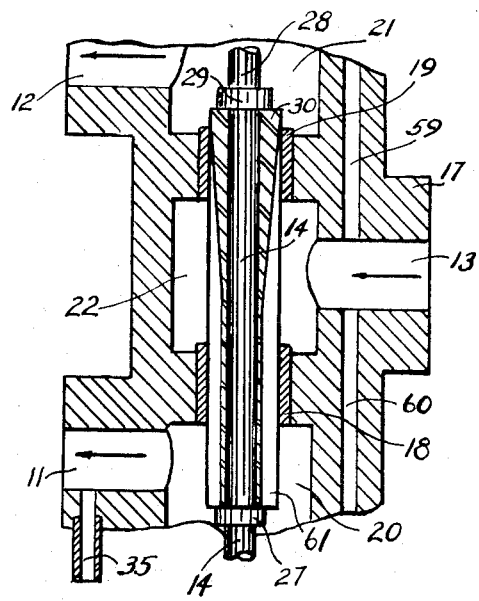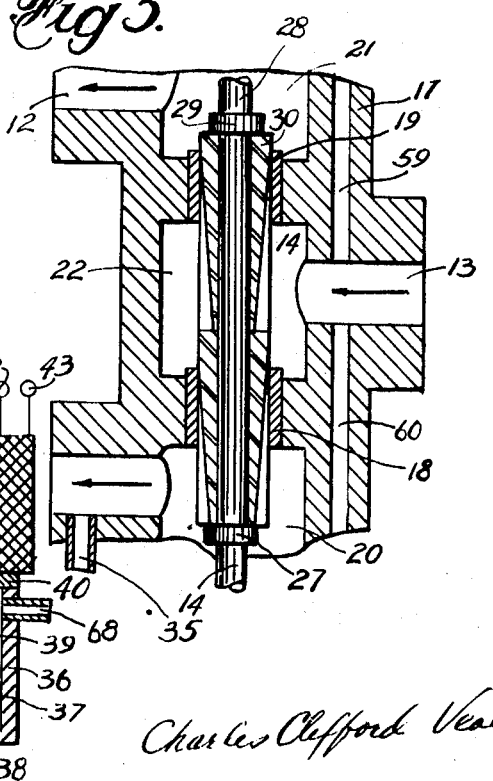

Fig.4.
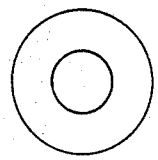 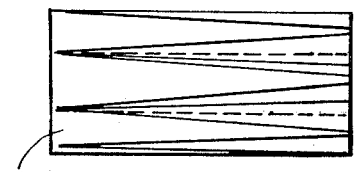 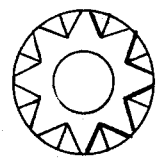
Fig.5.
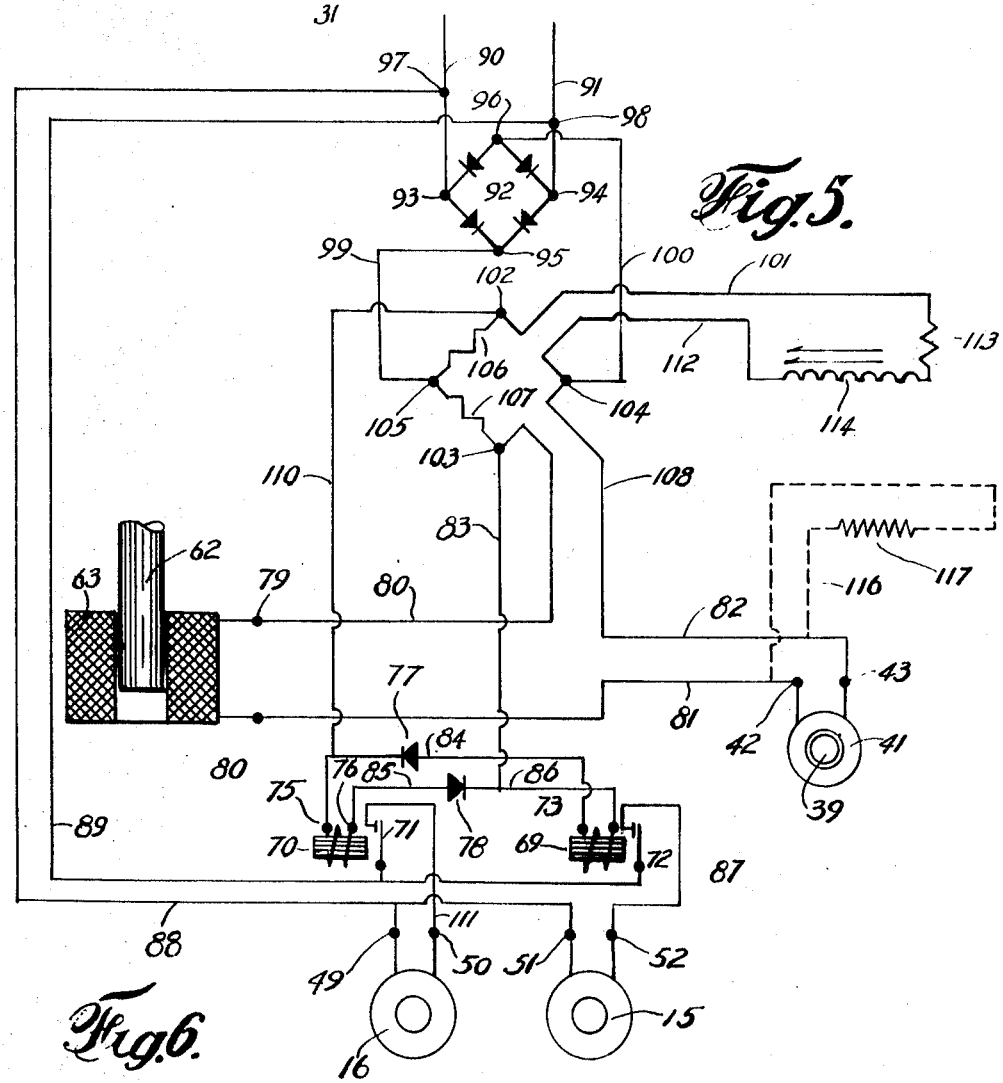
Fig.6.
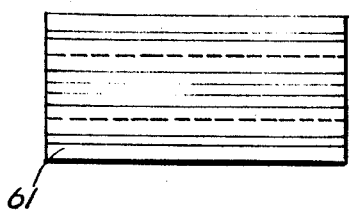 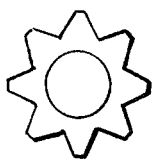
INVENTOR
Charles Clifford Veale INVENTOR
Charles Clifford Veale

CONTROL MEANS FOR PROPORTIONING AND MODULATING FLUID FLOW RATES TO REGULATE PRESSURES AND TEMPERATURES

This application, filed May 23, 1967, Ser. No. 642,285, is a continuation-in-part of Ser. No. 541,422 filed Mar. 7, 1966, now U.S. Pat. No. 3,322,342, granted May 30, 1967.

This invention relates to a fluid flow rate modulating, proportioning, and pressure-regulating means for performing and controlling useful functions of work and service.

In systems in which a fluid flow is proportioned into one or more channels and where the pressure is to be regulated to maintain a reasonably uniform and preset pressure level, it has been customary practice to use independent and manually operated and adjusted valves and other devices to perform the required functions of control. In many instances, these have to be readjusted in each individual case to establish the different flow rates and pressure levels. This is time consuming and is frequently laborious. What automatic devices there are on the market, are very expensive and complicated to a point where the cost in many instances is prohibitive to potential users.

An object of the present invention is to provide a useful and inexpensive control, a fluid flow rate, and a fluid pressure modulating system which can be preset by remote control means to establish and automatically maintain a required operating level.

Another object of the invention is to provide a system that employs electrical means provided with solenoid action in operating a proportioning valve to obtain such flow rate variation and control.

A further object of the invention is to provide a control system, as above indicated, that provides for a modulated or interrupted flow of electric current which controls the flow rate proportioning position or degree of valve opening, according to the position of the manual control setting or a change in the resistance or impedance of the sensor, or both.

Another embodiment of this invention relates to a modulating and proportioning means to divide one or more fluid flows into separate, proportioned flow rates at the command of a manual controller or a sensor, or both.

A still further object of the invention is to provide a system, as above characterized, in which each outlet flow is independently controlled and simultaneously operative to increase the flow rate of one outlet while proportionally decreasing the flow rate of the other outlet.

A still further object of the invention is to provide a system in which one outlet flow is maintained open and capable of maintaining a full flow while the flow through the other valve opening is being modulated to maintain a preset pressure level.

Another object of this invention is to provide a balanced-type valve that will modulate by means of a sensor, the flow rate of a fluid to maintain a preset temperature level.

A yet further object of the invention is to provide means in such a modulating valve to control the operative movement of the flow rate controlling means to obviate position hunting and large deviation from the preset conditions.

Another object of the invention is to provide a "Servo"-type instantaneous response in the degree of valve opening to a related position setting on a manually preset controller.

This invention also has for its objects to provide such means that are economical to manufacture, that are positive in operation, convenient to use, easily installed in a working position, and easily disconnected therefrom, relatively simple, and of general superiority and serviceability.

The invention also comprises novel details of construction and novel combinations and arrangement of parts, which will more fully appear in the course of the following description, and which is based on the accompanying drawings. However, said drawings merely show, and the following description merely describes, preferred embodiments of the present invention, which are given by way of illustration or example only.

In the drawings, like reference characters designate similar parts in the several views.

FIG. 2 is a fragmentary sectional view of the fluid flow-rate modulating means shown in FIG. 1, modified to provide a free flow valve element coupled to a flow-rate modulating valve means. It shall be understood that the parts broken away are illustrated at the top and bottom of FIG. 1.

FIG. 3 is a fragmentary sectional view of the flow-rate modulating means shown in FIG. 1, modified to include a pair of valve elements arranged to provide a fluid flow-rate balanced modulating means. It shall be understood that the parts broken away are illustrated at the top and bottom of FIG. 1.

FIG. 4 illustrates a valve element having a complement of flutes or grooves, each with diminishing cross section, thus providing a flow-rate modulating means.

FIG. 5 is a diagrammatic view, illustrating a control circuit for the valve arrangements shown in FIGS. 1, 2, and 3. It shall be understood that the part of the valve broken away is shown in FIG. 1.

FIG. 6 is a view of the lower valve element shown in FIG. 2, illustrating a tubular construction with a complement of flutes or grooves, each groove having a uniform cross section throughout its length.

FIG. 7 illustrates a fluid flow-rate modulating valve with complete fluid flow control.

Figure 1:
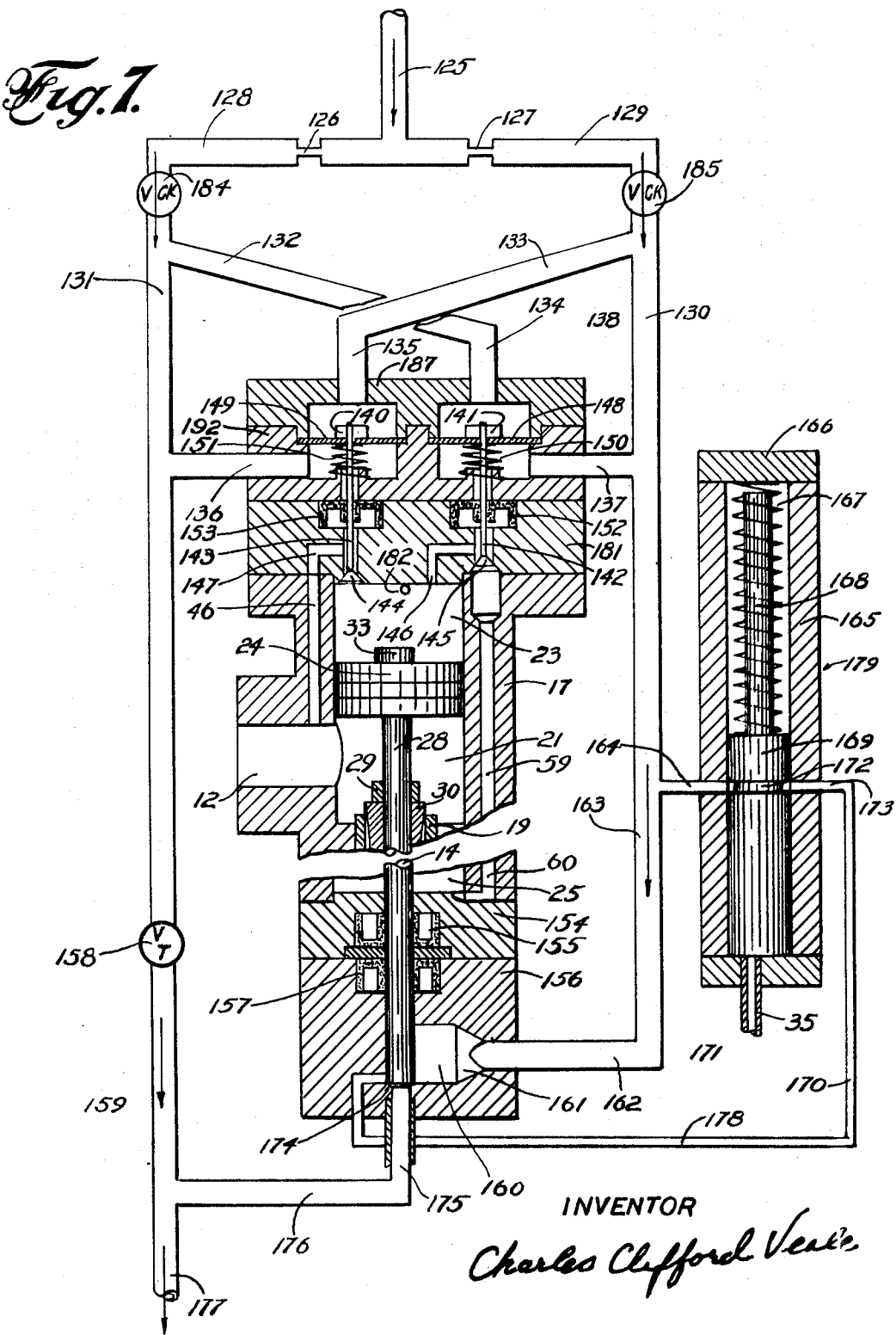
FIG. 1 is a longitudinal view of the flow-rate proportioning valve, provided with dual variable impedance coils and core, and resistance sensors controlling the fluid flow-rate modulating means for operating said valve.

The system that is illustrated in FIG. 1 comprises, generally, a valve 10 which is provided with one inlet 13 connected to a fluid source, two fluid outlets 11 and 12, and two valve elements 30 and 31 coupled together by means of valve stem 14, and collars 27 and 29 to proportion the flow from said inlet 13 to said outlets; pistons 24 and 26 each coupled respectively to each end of valve stem 14 by means of 28, 33, 32, and 62, two solenoids 15 and 16 operating the movements of valve elements 30 and 31 by means of pistons 24 and 26, a variable impedance armature core 62 connected to an extension to valve stem 14 which moves in and out of impedance coil 63 as the valve stem and valve elements 30 and 31 are raised or lowered, a sensor 118 responding to fluid pressure and capable of modulating an impedance as valve elements 30 and 31 are raised or lowered, a thermistor 117 responding to changes in temperature is included for alternative use, and an electric system responding to changes in the impedance in the sensing circuit and also responding to the resistance variation of a sensing thermistor, to alternately energize one solenoid or the other, according to the proportions of the fluid flow reaching outlets 11 and 12 from inlet 13 and changes in flow rate required by the sensor.

The valve 10 comprises a valve body 17 provided with aligned valve seat enclosures 18 and 19. The valve seat enclosure 18 opens on a chamber 20 that connects with outlet 11, and valve seat enclosure 19 opens on chamber 21 that connects with outlet 12. A chamber 22 extends between the seat enclosures 18 and 19 and connects with outlet 13. The valve assembly comprises two fluted cylindrical valve elements coupled and mounted on a valve stem 14. Each flute in the outer surface of the valve element provides a fluid flow opening of diminishing cross section throughout the length of said flute. It must be understood that the flutes with diminishing cross-sectional area along their lengths could be in the inner surface of the valve seat enclosure instead of on the outer surface of the valve element. The valve element 31 is operatively associated with valve seat enclosure 18 to control the fluid flow through said valve seat enclosure and valve element, according to the degree of intrusion of said valve element 31 into said seat enclosure 18. The diminishing cross section of each flute opening in association with said valve seat enclosure, decreases the fluid flow rate as the intrusion is increased, until with maximum intrusion the fluid flow opening through valve seat enclosure 18 is closed and fluid flow ceases. The valve element 30 controls the fluid flow rate through valve seat enclosure 19 in the same way, except that valve seat enclosure 19 closes as valve seat enclosure 18 opens, and vice versa. An impedance coil core extension 62 from valve stem 14 passes through closure cap 67 fitted to one end of body 17. The impedance coil core extension 62 moves in and out of impedance coil 63 which is attached to closure cap 67. A fluid flow passage 60 in valve body 17 extends from inlet 13 to convey fluid to chamber 25 which is below piston 26. The valve elements 30 and 31 in FIG. 1 may be operated by fluid flow and by means of two solenoids 15 and 16 which, in this particular case, are mounted in a convenient relationship on cap 48 clamped to the end of valve body 17. The solenoid 16 comprises a coil 120, an armature 53, operable in said coil 120, and an extension from said armature 53 is operatively connected with a control valve 45, which controls the fluid flow rate from chamber 23 above piston 24, through a passage 57 in cap 48 and channel 46 in valve body 17 to outlet 12. In a similar manner, the solenoid 15 comprises coil 121 and armature 54 operable in said coil, and on extension 56 from said armature 54 is operatively connected with a control valve 44 which controls the fluid flow from inlet 13 through a passage 59 in valve body 17, to passages 58 and 47 in cap 48 opening into chamber 23 above piston 24.

It will be noted that the effective fluid pressure area on the upper side of the piston 24 is greater than the area on the bottom side of piston 26. This area differential results in an overbalancing fluid pressure on the piston 24, retaining the valve element 30 in the closing position. Channel 35 controls the fluid flow from entrance 34 to the underside of piston 37 in sensor cylinder 36. Piston 37 is attached to coil core 39 which is operable in coil 41 to increase or decrease the impedance of sensor 118. The upward movement of piston 37, induced by fluid flow pressure in channel 35, is biased by spring 40. As the fluid pressure is increased in channel 35, piston 37 will intrude core 39 into coil 41, and at the same time compress biasing spring 40. The amount of core 39 intrusion into coil 41 is determined by the degree of fluid pressure in pipe 35 acting on piston 37. As the pressure is increased, the piston will rise against the increasing pressure of biasing spring 40. The degree of core 39 intrusion into coil 41 is related to the pressure in channel 135, Screw 38 holds piston to core 39. Channel 35 and flow entrance 34 may be connected to any suitable point in the fluid flow system where the fluid flow pressure has need to be controlled. Channel 68 is an outlet to eliminate back pressure in spring chamber when piston 37 rises. Leads 49, 50, 51, and 52 are solenoid coil connectors. Leads 42 and 43 are wire connectors to energize impedance coil 41.

The modification to the valve as shown in FIG. 2 includes replacing the lower valve element 31 used in FIG. 1, by substituting valve element 61. This change permits free fluid flow from inlet 13 to outlet 11. The action of the valve is the same as that in FIG. 1, except that fluid flows through valve element 61 and valve seat enclosure 18 for all positions of the valve elements 30 and 61. In this valve action only valve element 30 would modulate the fluid flow to outlet 12. The valve action thus described and illustrated in FIG. 2 will regulate fluid pressure by bleeding off fluid from a fluid supply to inlet 13, or it can be used as an unloading device to reduce the power load required on fluid flow equipment during a period of idling.

The modification to the valve as shown in FIG. 3 comprises the substitution of a reversed valve element 180 for the valve element 31 shown in FIG. 1. This change permits the valve 10 to function as a balanced modulating unit to modulate the flow volume of a fluid to any objective or apparatus requiring such control. In this application, outlets 11 and 12 would be connected to form one outlet supply. All other sensing and operating functions would be the same as that required and used in operating the valve shown in FIG. 1 and FIG. 2.

The valve element in FIG. 4 illustrates one particular type of valve element that can be used in connection with a valve seat enclosure to modulate the flow rate of a fluid. The particular construction shown is the same as that illustrated in FIG. 1, FIG. 2, and FIG. 3. The FIG. shown illustrates a flute or groove of triangular cross section identified as 30, 31. When the valve element is inserted in a circular valve seat enclosure opening, the cross section of the flute or groove will comprise a circular sector. For this application the cross-sectional area of each flute is not uniform for its entire length but the cross-sectional area diminishes to zero as it approaches the opposite end of the valve element. Any shape of flute, groove, or valve modification may be used as long as its cross-sectional area diminishes with length. Any number of flutes or grooves may be used around the periphery of the valve element. The length of the flutes need not be parallel with the axis of the valve element but, for example, could be spirally formed or cut. A center hole along the axis is used for mounting purposes but it could facilitate producing the valve element from tubing and swaging, or forming the flutes in a punch press. However, the valve element could be constructed as a member integral with any suitable and associated valve component. A valve element of this type can be used as a single valve element or used in association with other units to proportion two or more fluid flows or used in association with a similar valve to establish a balanced function in a single fluid flow. FIG. 5 illustrates a diagrammatic view of a control circuit for controlling the valve functions of the valve in FIG. 1, and a modified version of the valve illustrated and described for FIG. 2 and FIG. 3. AC power lines 90 and 91 are connected across the terminals 93 and 94 of a full wave rectifier 38, and the latter, from its output terminals 95 and 96, by means of conductors 99 and 100 provides DC to terminals 104 and 105 of a Wheatstone bridge 123. When impedance coils are used in the bridge controls, the full wave rectifier may be omitted to effect a better balance in the bridge system. Two legs of the bridge are provided with fixed resistors 106 and 107; a third control leg 102–104 includes an adjustable core impedance unit 114 and a variable resistance 113 may be connected in parallel with controller 114, and either controller may be used to control the manual setting of the valve. Control 114 is connected to the bridge leg by conductors 101, 124, and 112. Controller 113 is connected to the bridge leg by conductors 101 and 112. The fourth leg of the bridge is a sensor leg having a variable impedance sensor 118 and a variable core inductor, comprised of armature core 62 and coil 63. The variable impedance sensor 118 is a fluid pressure sensor as shown in FIG. 1, for pressure regulation. When fluid flow rate modulation is required for regulating ambient temperatures and the like, the sensor 118 is replaced by temperature sensor 117 with its variable resistance using conductors 115 and 116, shown by the dotted lines. A fixed resistor 119 is connected across the terminal conductors 31 and 32. The armature core 62 is adjustably carried by the valve element mounting stem 14, as shown in FIG. 1.

The solenoids 15 and 16 are connected in parallel with each other and by conductors 83 and 110 to the respective output terminals 102 and 103 of the Wheatstone bridge. The conductors are so connected to two switching devices 69 and 70 that DC is supplied to them alternately and oppositely; the rectifiers 77 and 78 control the direction of the current flow so as to actuate the switching devices 69 and 70 alternately, or as called for by the sensing devices 117 or 118. The switching devices 69 and 70 are connected to respectively operate solenoids 15 and 16 alternately, as called for by sensor 117 or 118.

The valve element 61 shown in FIG. 6 is also shown on FIG. 2. This view illustrates the design features of one particular type of valve element, operatively associated with a valve seat enclosure opening similar to 18 in FIG. 2. The FIG. shown illustrates a flute or groove with a triangular cross section; however, any shape may be used for the cross-sectional area of each flute. When the valve element is inserted in a circular valve seat enclosure opening, the cross-sectional shape of each groove will comprise a shape similar to a circular sector. The cross-sectional area of each flute is uniform for the entire length of the valve element. Any number of flutes or grooves may be used around the periphery of any one valve element. The flutes need not be parallel to the axis of the valve element but, as for example, may be spirally formed or cut. The center hole along the axis of the valve is used to facilitate mounting on a valve stem. The valve element could be constructed as an integral member of an associated component.

The control circuitry shown in FIG. 5 indicates a two station control; either control could be used a a single station control. When the variable impedance control 114 is set at maximum impedance and resistance, the inductor core 62 should be at full intrusion in impedance coil 63. To obtain this adjustment, the effective impedance and resistance of the combined units balance the impedance and resistance of variable control 114. The combined units comprise coil 63 in series with resistor 119, and parallel-connected sensor 118 which is connected across resistor 119.

When the effective impedance and resistance in bridge leg 102-104 balances the effective impedance and resistance in sensing leg 103-104, as above indicated, no current flows across the terminals 102-103. When a lower fluid pressure is required in the branch outlet 11 when connected to a work load, variable inductor 114 or potentiometer 113 is set to reduce the impedance or resistance respectively, of control leg 102-104 of the bridge, thereby unbalancing the bridge so that there will be current flow from bridge terminal 103 through conductor 83 and conductor 86, to terminal 74 of switching device 69, and from the other terminal 73 through conductor 84, through rectifier 77 and conductor 110, to bridge terminal 102. The rectifier 78 will block this current flow to switching device 70, and the latter will be unenergized. As soon as switching device 69 has been energized, contactor 72 will close, and current will flow through leads 87, 88, and 89, and through solenoid 16. The above energization of solenoid 16 will cause the armature 53 thereof to move in a direction to open control valve 45, causing relief of pressure in the upper portion of chamber 23, through passages 57 and 46. The greater pressure in lower cavity 25 will urge pistons 24 and 26 upward. Therefore, the valve stem 14 and 28 will open valve element 30 and in its upward movement gradually increase the fluid flow rate through fluted in valve element 30 into chamber 21 and outlet port 12. As the fluid flow rate through valve element 30 increases, the fluid flow rate through the flutes of valve element 31 decreases. When the fluid pressure decreases to the pressure level preset by the manual control 113 or 114, whichever is used, impedance coil core, being operatively connected to valve stem 14, will be moved by the differential fluid forces on the pistons 24 and 26. As said core 62 is being retracted from coil 63, the effective impedance across the bridge terminals 103 and 104 will be reduced and control valve 45 will close. Upon balance between bridge legs 102-104 and 103-104 being achieved, the valve stem 14 will become stationary; upon any change of pressure applied to sensor 118, it will respond to change the effective impedance and resistance, which will again unbalance the bridge so that a corrected setting of stem 14 is effected and the bridge becomes rebalanced. In cases where the fluid pressure is less than the lower tolerance level of that preset by controller 113 or 114, the bridge will become unbalanced in the opposite direction. The effective impedance and resistance of the sensing leg 103-104 will be lower than that of bridge leg 102-104, causing a current to flow from bridge terminal 102 through conductor 110, so terminal 75 of switching device 70, and from the other terminal 76 through rectifier 78, to bridge terminal 103. In this case, the rectifier 77 will block current flow to switching device 69, which will remain unenergized. As soon as switching device 70 is energized, contacts 71 will close, and current will flow through conductors 88 and 89 and through terminals 49 and 50 to energize solenoid 15. As a consequence, control valve 44 will open to cause fluid to flow through channel 59 into cavity 58 and through channel 47, and on into chamber 23. The greater total force on piston 24 will cause piston 24, stems 14 and 28, valve elements 30 and 31, and piston 26, to move downward which will cause less fluid flow to outlet 12 and more flow through the flutes of valve elements to chamber 20 and on to outlet 11. Piston 37, FIG. 1, will sense the increase in pressure and move core 39 into coil 41 to balance the bridge. When the bridge is balanced, no current will flow across bridge terminals 102-103, and control valve 44 will close.

The same procedure will follow when the valve is used for proportioning hot fluids to control ambient temperatures, in which case temperature sensor 117 will be used in place of pressure sensor 118.

It will be clear that alternately opening and closing control valves 44 and 45, as above outlined, will maintain a uniform fluid pressure or temperature within operating tolerances. The reversal of current flow in conductors 83 and 110 accomplishes the above alternation.

The fluid flow-rate modulating valve illustrated in FIG. 7 is the same as that shown in FIG. 1, including the modifications illustrated in FIG. 2 and FIG. 3, except as indicated in the following: The valve shown in FIG. 7, however, has a full fluid flow sensing and operating control instead of the electric system shown in FIG. 5, and is comprised, generally, of lower cap assemblies consisting of inner lower cap and seals 154 and 155 respectively, and outer lower cap 156 and seal 157, which have been substituted for the cap 67, impedance coil 63, and armature 62. Pressure sensing valve 179 has been substituted for the sensor 118, FIG. 1, upper caps 192, 181, and 187, and associated control valves 144 and 145, seals 152 and 153; and diaphragms 148 and 149 have been substituted for cap 48, solenoids 15 and 16, and control valves 44 and 45. The fluid flow channels with certain modifications, have been arranged to function in a manner similar to an electrical bridge-type control.

Valve body 17, as shown in FIG. 1, FIG. 2, and FIG. 3, is provided with aligned valve seat enclosures 18 and 19. The seat enclosure 18 opens on chamber 20 which connects with inlet 11, and seat enclosure 19 opens on chamber 21 which connects with inlet 12. An inlet chamber 22 extends between the seat enclosures 18 and 19 and connects with inlet 13. The pistons 24 and 26, and valve stem components 28, 14, 33, 29, 27, and 32 are arranged as shown in FIG. 1. The valve elements 30, 31, 61, and 180 are used in the various arrangements shown in FIG. 1, FIG. 2, and FIG. 3. The valve stem 14, FIG. 7, has been extended to replace inductor core 62.

The end of plunger stem has been provided with valve seating means to open or close fluid outlet to channel 175.

The pressure sensing device 179 is comprised of: a valve body 165; a cap 166, which closes one end of valve body 165; a cap 171, which closes the opposite end of valve body 165 except for the pressure inlet channel 35; spring 167 which preloads plunger valve 169 and urges the movement of the valve in one direction; an annular groove 172 in plunger 169 for controlling the flow rate of a fluid; and ports 164 and 173 in valve body 165 comprising a flow inlet and outlet. Many different types of pressure sensors could be used in this application; for example, a sensor in which a pressure actuated plunger and spring resiliently opposes the opening of a poppet valve under pressure could be used.

Plunger 169 is a pressure sensor and responds to changes and fluctuations in fluid flow pressure that needs to be regulated. Plunger stem 168 acts as a stop against cap 166 when ports 164, 172, and 173 are fully closed in response to maximum fluid pressure. The plunger 169 and groove 172 modulate the fluid flow rate from channel 130 through port 164 to channel 173, in response to fluctuations in fluid pressure applied to plunger 169 and by means of channel 35.

126 and 127 are fluid flow-rate restricting means of generally equal cross-sectional area. 148 and 149 are diaphragms; however, other flow-sealing and movable means such as a piston responding to fluid pressure, may be used to open or close control valves 144 and 145, which respond to changes in fluid pressure to open and close said control valves 144 and 145.

Springs 150 and 151 are means urging control valves 144 and 145 to close. 160 is a vertical slit, although other means, such as a ball and spring could be used, and is used as a feedback control component which, in conjunction with valve stem 14, modulates the fluid flow from channel 162 through flare 161, and through slit 160 as the valve stem 14 moves up and down. 46 is the fluid outlet means from chamber 23. 146 is the fluid inlet channel from channel 59. Channels 164, 173, 170 and 178 comprise a fluid bypass means to channels 162 and 163, flare 161 and slit 160, to provide means for making corrections in fluid pressure when deviations from the preset pressure tolerance levels occur and need to be corrected.

The control system shown in FIG. 7 includes a fluid control bridge having a complement of channeled legs coupled together to provide means for modulating a fluid flow rate of one or more fluid flows. Pipe 125 is connected to a fluid pressure source, and branches into two channeled legs 128 and 129, respectively. Fluid flow rate restricting means 126 is connected in the first of said two channeled legs, and another rate restricting means 127 is connected in the second channeled leg. A third channeled sensing leg consisting of channels 163, 162, 175 and 176 is connected to channel outlet 177. The other end of the third channeled sensing leg is connected to the end of the second channeled leg in a trifurcated junction to pipe 137, the other end of which is connected to the cavity below diaphragm 148. A fluid flow modulating means is connected in said third channeled leg, comprised of cap 154, seals 155 and 157, valve stem 14 which has a seat closing means to close on valve seat 174. Included in the channel of said third channeled leg is a flare 161 and a slit 160 which is used in conjunction with valve stem 14 to modulate the fluid flow through channels 175, 176, and 177. A fourth channeled control leg 159 is connected from the end of the first channeled leg 131 in a trifurcated junction to provide an output connection for channel 136. The other end of channeled leg 159 is connected to an outlet 177. Throttling valve 158 is connected in said fourth channeled leg 195 to preset the desired operating level of said fluid flow bridge. Channel 136 is connected from the bridge output connection to the underside of diaphragm 149. Channel 132 is connected from a junction in said first channeled leg 131 to the cavity on the upper side of diaphragm 148. Pipe 133 is connected from a junction in said second channeled leg 130 to the cavity on the upper side of diaphragm 149.

In the operation of the valve in FIG. 7, fluid flow under pressure enters channel 125, then divides and flows through fluid flow rate restricting means 126 and 127, and on through channel 131 to throttle valve 158 which is assumed closed. Fluid pressure from the source to be controlled also will flow into channel 35, into sensor 179, and as a result, force will be applied on plunger 169 which will move and compress spring 167. If the fluid pressure in channel 35 is sufficiently high, port 164 in valve body 165 will be closed. Fluid pressure also flows through channels 129, 130, 162, flare 161, slit 160, and is stopped by valve stem 14 when it is closed on seat 174. Fluid flow also enters channel 164, and is stopped by plunger 169 which is closed. With this condition existing, the pressure in channel 132 and 133 is balanced, and the same pressure is on both sides of diaphragms 148 and 149. Spring pressure from springs 150 and 151 will urge valves 144 and 145 to remain closed. When control valves 144 and 145 are closed, the fluid in cavity 23 will prevent the pistons 24 and 26, FIG. 1, from moving upward. When piston 24 and 26, associated valve elements are down, fluid flow will enter inlet 13 and flow through outlet 11 to the equipment being operated. No fluid will flow through outlet 12. To preset the level of fluid pressure desired, valve 158 should be opened to the required degree. This action will unbalance the bridge system and fluid will flow through channels 131 and 159. As a result, the pressure in channel 132 will be reduced and be less than that in channel 133. Therefore, pressure in cavity 139 will be greater than that from channel 136 so that diaphragm 149 will compress spring 151 and open control valve 144. When control valve 144 opens, fluid will be forced out of cavity 23 by the pressure exerted on the lower piston 26 by fluid pressure in cavity 25. As piston 24 and 26 begin to rise, valve stem 14 will rise the same amount, and valve element 30 will begin to open and permit fluid to flow through valve seat 19 and valve element 30, into cavity 21 and through outlet 12. At the same time that valve element 30 opens, fluid will begin to flow through slit 160 and into channel 175, 176, and into channel 177, where the fluid will either go back to the sump for reuse or go back to the drain, depending on the application. As valve stem 14 continues to move upward, the fluid flow rate from slit 160 increases, and more fluid flows into channel 175, and the pressure in channels 129, 130, 163, and 162 will be reduced and will continue to lower as more fluid flows through slit 160. When the pressure on the diaphragm in cavity 139 equals the pressure below the diaphragm from channel 136, pressure from spring 151 will close control valve 144. Pistons 24 and 26, controlling the movement of the valve elements and stem 14, will then become stationary, indicating that the valve seat closing elements are in the position preset by throttling valve 158. Should the pressure drop slightly from the prescribed setting, the pressure in channel 35 will be reduced, thus lowering plunger 169 which controls the position of port groove 172 with relation to ports 164 and 173. When the pressure in the outlet 11, FIG. 1, is maximum, spring 167 is compressed to the maximum, and ports 164 and 173 are closed. As the pressure drops in channel 35, spring 167 will force plunger 169 downward and more fluid will flow through ports 164, 173, and channels 170, 178, 175, and 177. The pressure in channels 129, 130, 162, 133 and particularly 137 will reduce the pressure in spring cavity below diaphragm 148, so that it is less than the pressure in cavity 130 which is above diaphragm 148. The higher pressure in cavity 138 will begin to open control valve 145 and fluid will flow into piston cavity 23 through channels 59 and 146. The total force on piston 24 from the incoming fluid from channel 146 is then greater than the total force on piston 26, FIG. 1, so that piston 24 and 26 will move downward and reduce the fluid flow rate through outlet 12. This will result in the pressure building up in channel 35. Plunger 169 will therefore rise and reduce the flow through channels 164 and 173, causing an increase in pressure in channels in 129, 130, 163, and 162. When this occurs, pressure on both sides of diaphragm 148 will approach a balanced condition, and spring will close control valve 145. Pistons 24 and 26 will then be stationary. Should the pressure of the fluid flowing through outlet 12 become higher than the preset tolerance levels set by valve 158, the pressure in channel 35 would increase, forcing the plunger upward and compressing spring 167 until spring 167 and plunger 169 pressure is balanced. This movement upward would further restrict the fluid flow through channels 164, 173, 170, 178, 175, and 177, causing an increase in pressure in diaphragm cavity 139, which will open control valve 144. When control valve 144 opens, fluid will be forced out of cavity 23 by the pressure on piston 26, and both piston and valve 30 and its associated valve element will move upward to bleed more fluid through outlet 12, resulting in less pressure in the fluid, the pressure of which is being sensed by means of sensor 179. It will be clear that alternately opening and closing control valves, as above outlined, will maintain a uniform pressure within operating tolerances.

Another unique and effective circuit can be used by substituting a plain and solid end cover for the assemblies, comprising: inner cover 181, intermediate cover 180, and outer cover 179, including control valves 144 and 145, springs 150 and 151, diaphragm 148 and 149, and seals 152 and 153. In this arrangement channels 136 and 137 would be eliminated, as well as channels 46, 59, and 60. Channel 132 would be connected to port 182, and channel 133 would be connected to introduce fluid through port 183 to chamber 25.

With this arrangement, assuming that valve elements and stem 14 are down and fluid flow from channel 162 to channel 175 is shut off or approaching a shutoff condition, valve 158 is closed and port entrance 164 also is closed, and if it is desired to raise piston 24, valve elements 30 and 31 and pistons 24 and 26, then valve 158 should be opened to the required degree to discharge fluid flow into channel 159. When valve 158 is opened, pressure will drop in channels 131 and 132 and also in cylinder chamber 23. Plunger 169 also will sense the reduction in pressure and begin to open ports 164 and 172, after valve element stem 14 has opened valve seat 174. The higher pressure in chamber 25 will force piston to open valve element 30. Pistons 24 and 26 will continue to rise when the pressure in channel 162 balances pressure in channel 131, the movement of pistons 24 and 26 will cease. When it is desired to close valve elements 30 and 31, throttling valve 158 is closed. Then the pressure in channel 131 will be higher than that in channel 130, and in cylinder chamber 25. Pistons 24 and 26 and stem 14 will move down and close valve seat 174, and valve element stem 14 will close slit 160. With the increase in pressure, plunger 169 will compress spring 167 and will close port 164. Spring-loaded check valves 184 and 185 are used to stabilize the valve and said bridge from fluid shock. The check valves 184 and 185 can be placed in any convenient strategic position in each of the channels 130 and 131. It will be clear that with this unique control arrangement, pistons 24 and 26 will move in response to changes in pressure balance and modulate the fluid flow through valve elements 30 and 31.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what I claim and desire to be secured by Letters Pat. is:

1. Control means for fluid flow comprising:
  a. a valve having a valve body with one inlet and two outlets, each for a modulated and proportioned fluid flow rate, a fluted valve assembly means having a valve element in sliding engagement with a valve seat enclosure between said inlet and each outlet, fluted channels in said valve assembly means, each fluted channel having a diminishing cross-sectional area along its length, said valve elements varying the flow rate of a fluid through said fluted channels depending on the degree of intrusion of said valve element into said valve seat enclosure, flow-sealing pistons that have sliding engagement with the walls of cylinders at each end of said valve body operatively attached to said valve elements, a valve stem connected to said valve elements and extending through one end of the valve comprising a cover,
  b. an inductor core operatively connected to said valve stem and movable in an impedance coil connected in the sensing leg of a Wheatstone bridge, a presettable inductor core operatively movable in an impedance coil connected in the control leg of said bridge, said valve stem inductor core and valve elements moving in response to a preset level of said impedance control leg inductor core, an impedance differential between said control and sensing legs, causing an imbalance in said bridge which thereby moves said valve elements and valve stem, solenoid means consisting of two solenoids mounted on said valve, the armature of each of said solenoids operatively connected to a control valve, one control valve modulating the flow rate of a fluid in a channel directed from said valve inlet to said cylinder adjacent to said solenoids, the other control valve controlling the flow rate of a fluid in a channel from the latter said cylinder to one of said valve outlets, a fluid flow channel from said valve inlet to the cylinder in the opposite end of said valve, the control valve in the channel from the inlet and directed towards the two solenoids being set to open under fluid pressure from said inlet, the control valve in the channel to the outlet from said cylinder being set to be retained closed by the fluid pressure in the cylinder chamber,
  c. a Wheatstone bridge which has the input terminals connected to an AC current source and provided in two of its legs with fixed reference resistors, a presettable inductor core and coil connected in the control leg of said bridge, a valve stem operated inductor core in said sensing leg of said bridge, and electrical system, in which said Wheatstone bridge is included, having two switching means connected in parallel across the output terminals of said bridge with oppositely connected rectifiers in the circuit of each switching means, each of said switching means connected to a solenoid, the armature of each of said solenoids operatively connected to said control valve, an impedance differential current across the output terminals of said bridge, causing one or the other of said control valves to open, means operative upon a change in the electrical balance of said bridge to actuate one or the other of said switching means and to thereby energize the connected solenoid coil and armature, said connected solenoid thereby opening a control valve with which operatively connected, thereby causing a fluid pressure differential in said cylinders and against said pistons, causing said valve elements to move.

2. Control means for fluid flow according to claim 1 in which:
  a. each of said valve elements is engaged in a valve seat enclosure, each of said valve elements is fluted, each flute in said valve element has a diminishing cross-sectional area along its length to provide means for varying the flow rate of a fluid through the respective flutes and said valve seat enclosures according to the degree of intrusion of said valve elements into said valve seat enclosures.

3. Control means for fluid flow according to claim 1 in which the fluted valve assembly provides for one fluid flow valve element means to be in the full-flow open position at all positions of said valve element's intrusion in said valve seat enclosure while the other valve element modulates a fluid flow rate.

4. Control means for fluid flow according to claim 1 in which the valve body structure provides a valve body having one fluid flow inlet, one fluid flow outlet, one fluted valve assembly means between said inlet and said outlet, and one fluid flow modulating valve element operatively engaged in said valve seat enclosure and modulating the flow rate of a fluid flowing through said valve inlet, fluted valve assembly means and valve outlet.

5. Control means for fluid flow according to claim 1 in which a pressure-sensing means comprises:
  a. a spring-loaded movable means in an enclosure, subject to variations in fluid pressure applied against said movable means, said movable means modulating the flow rate of an electric current in the sensing leg of a Wheatstone bridge, and
  b. an inductor core sliding in and out of an impedance coil, and operatively connected to said spring-loaded movable means,
  c. connecting means at the ends of said impedance coil, said impedance coil connected in the sensing leg of said bridge,
  d. connecting means for applying fluid pressure to said movable means, and a vent in said enclosure to eliminate back pressure on said movable means.

6. Control means for fluid flow comprising:
  a. a valve having a body with one inlet for fluid flow and two outlets each carrying a modulated and proportioned fluid flow, a sensor connected in a fluid flow channel of said valve to modulate the flow rate of a fluid in a fluid control bridge in response to changes in the pressure of a fluid flow, a fluid flow-rate modulating means between said inlet and each outlet, a seat-closing valve element in engagement with said valve seat enclosure means, and modulating the flow rate of a fluid through said valve seat enclosure means, said seat enclosures and seat-closing valve elements being relatively spaced in relation to said valve seat enclosure means and connected together so that both said valve elements move at the same time to modulate the fluid flow through each of said valve seat enclosure means, flow sealing and movable means at each end of the valve operatively connected to said valve elements, valve chambers at the outer ends of said valve providing means for applying fluid pressure to the chambers at the outer end of each of said flow sealing and movable means, channeling means connecting said valve chambers to the differential pressure output connections of said fluid flow control bridge, b. a fluid flow control bridge having a complement of channeled legs for fluid flow and fluid flow-rate modulating means connected therein to control the degree of movement of said seat closing valve elements, the first and second of two channeled legs being connected to a common fluid pressure source, each of said first and second channeled legs being provided with a fixed fluid flow-rate restricting means connected therein, a third channeled leg joined to said second channeled leg in a trifurcated junction to provide a bridge-controlled fluid flow output means in said bridge, said third channeled leg provided with a sensing and fluid flow-rate modulating means connected therein, the opposite end of said third channeled leg and the end of a fourth channeled leg connected to a common fluid flow outlet, the opposite end of said fourth channeled leg connected to the other end of said first channeled leg in a trifurcated junction to provide a second bridge-controlled fluid flow output means in said bridge, said fourth channeled leg having a presettable fluid flow rate throttling means connected therein, fluid flow channeling means connecting one of said bridge-controlled fluid flow output means to one of said chambers in said valve, fluid flow channeling means connecting the other of said bridge-controlled fluid flow output means to said chamber in the other end of said valve, c. a fluid flow-rate control system including said fluid flow control bridge in which said system provides a controlled differential pressure flow across said output connecting means when said bridge becomes unbalanced, said differential pressure flow applied in said chambers and against said flow sealing and movable means to move said valve elements.

7. Control means for fluid flow comprising:

a. a fluid flow control bridge connected to a fluid pressure source and having a complement of channeled legs and fluid flow-rate modulating means to control the functions of a controlled functional means, b. the first and second of two channeled legs connected to a common fluid flow pressure source, each of said first and second channeled legs provided with a fixed fluid flow rate restricting means connected therein, a third channeled leg joined to said second channeled leg in a channeled trifurcated junction which provides a bridge fluid flow output and connecting means, a sensor and fluid flow-rate modulating means connected in the sensing leg of said bridge, the opposite end of said third channeled leg and the end of a fourth channeled leg connected to a common fluid flow outlet, the opposite end of said fourth channeled leg connected to the other end of said first channeled leg in a trifurcated channeled junction which provides a second bridge controlled fluid flow output and connecting means, a presettable fluid flow rate throttling means connected in the control leg of said bridge, a fluid flow rate channeling means connected from the bridge output connection in said trifurcated junction between said fourth and first channeled legs to said controlled functional means, a fluid flow-rate channeling means connected from said bridge-controlled output connection in the trifurcated junction between the second and third channeled legs to said controlled functional means, c. a fluid flow bridge that provides a controlled and modulated fluid flow rate output and differential pressure means across said two fluid flow channeled output connections when said bridge becomes unbalanced, said sensing and flow rate modulating means in said third channeled leg operating with said flow rate throttling means in said fourth channeled leg and accordingly to thereby control the functions of said controlled functional means.

8. Control means for fluid flow according to claim 6, in which:

a. a valve has a valve body with one inlet for fluid flow, and two outlets, each to carry a modulated and proportioned fluid flow, b. a valve seat enclosure in the valve between the inlet and each outlet, c. a valve is provided with two spaced seat-closing valve elements in sliding engagement with said valve seat enclosure, said valve seat enclosures and seat-closing valve elements being relatively spaced so that upon movement of said valve elements, one of said valve elements moves in a valve seat closing direction while the other moves in a valve seat opening direction, thereby proportioning the flow rate from the inlet to each outlet, according to the relative positions of said valve elements;

d. control valve operating means mounted on said valve which when selectively energized moves said seat closing valve elements in either direction, depending on which control valve operating means is actuated, e. the ends of the valve elements are provided with flow-sealing sealing pistons that have sliding engagement with the wall of a cylinder chamber in each end of the valve body, the valve elements at the end directed towards said two fluid pressure control valve operating means terminate at the outer face of the piston thereon, and the opposite end having a stem extending through the cap at the opposite end of the valve, comprising the valve body cover, f. a passage connecting the inlet and the upper end of one of the cylinder chambers is directed towards said control valve operating means, g. a passage similarly connects an outlet and said end of the latter cylinder chamber, h. each passage is provided with a control valve, and the control valve in the first passage is set to open under fluid pressure from the pressure source and the control valve in the second passage is set to be retained closed by fluid pressure in said cylinder chamber, each control valve is operatively connected to one of said control valve operating means, i. a fluid flow bridge having a first and second channeled leg connected to a common fluid pressure source, and each of said legs having a fixed flow rate restricting means connected therein, the opposite end of said second leg being connected to a third and sensing leg in a channeled trifurcated junction to provide a bridge fluid flow output and connecting means, the opposite end of said first leg is connected to a fourth channeled and control leg in a channeled trifurcated junction to provide a second bridge fluid flow output connection, the opposite ends of the third and fourth channeled legs are connected to a fluid flow outlet, said fourth leg having a presettable fluid flow rate throttling means connected therein, said third channeled leg is provided with a pressure-sensing and fluid flow-rate modulating means connected therein, said sensing and flow-rate modulating means is operatively connected to said valve elements by means of said stem, said controlled output connections of said fluid flow bridge are connected to said control valve operating means, j. a fluid flow control system including the fluid flow bridge that energizes said control valve operating means in response to variations in the fluid pressure, effecting said pressure sensing means and thereby adjusting the position of the valve element means relative to the valve seat enclosures to proportion the flow reaching said two valve outlets from said valve inlet, k. a passage from said inlet is directed to a cylinder chamber in the opposite end of the valve body.

9. Control means for fluid flow according to claim 8 in which:

a. a fluid flow-rate modulating means between said inlet and each outlet is comprised of a seat closing valve element that has sliding engagement in a valve seat enclosure and is provided with fluted fluid flow channels for varying said fluid flow rate, b. said fluted channels are provided between said valve element and said valve seat enclosure, c. each fluted channel has a diminishing cross-sectional area along its length which includes means for varying said flow rate through said fluted channels, according to the degree of intrusion of said seat closing valve elements into said valve seat enclosure.

10. Control means for fluid flow according to claim 7 in which:

a. valve seat means is provided in the outlet of a fluid flow bridge, a valve seat closing means is operatively associated with said valve seat means to terminate the flow rate of a fluid through said outlet when said bridge is inoperative, b. said valve seat closing means is operatively connected with said controlled functional means and is in the closed position in relation to said valve seat means when said throttling means in the channeled control leg of said bridge is closed, c. a flow rate modulating means is connected in the channeled sensing leg of said bridge and is operated by said controlled functional means.

11. Control means for fluid flow according to claim 6 in which a fluid pressure sensing means comprises:

a. a spring-loaded component, movable in an enclosure and subject to variations in the fluid pressure, and modulating the flow rate of a fluid, b. an inlet and an outlet port in said enclosure, a valve seat and a valve seat closing means in association with said ports, and means for modulating a fluid flow rate in said channeled sensing leg, c. a fluid pressure entry port and connecting means in said enclosure for applying pressure variations to said movable component to modulate said flow rate through said inlet, and valve seat and valve seat closing means and outlet port, d. a vent in said enclosure to eliminate back pressure on said seat closing means.

12. Control means for fluid flow according to claim 7 in which:

a. a fluid pressure sensing means is provided and is connected as a bypass in the sensing channel of said fluid control bridge, b. the inlet port of said sensor is connected in said sensing channel of said bridge on the inlet side of said flow rate modulating means, c. the outlet port of said sensing means is connected in the sensing channel between said flow rate modulating means and the outlet of said bridge, d. said pressure-sensing means has a spring-loaded valve seat closing means, movable in a valve seat enclosure and subjected to variations in fluid pressure, e. inlet and outlet ports are provided in said enclosure, and a valve seat and seat-closing means are provided in association with said ports, modulating a fluid flow rate, f. a biasing spring resiliently opposes the movement of said seat closing means, g. a vent is included in said enclosure to eliminate back pressure.

13. Control means for fluid flow according to claim 8 in which:

a. a fluid flow channeling means is connected from the bridge output connection in the trifurcated junction between the first and fourth channeled legs to the underside of the movable component in one of said control valve operating means and to the upper side of the movable component in the other control valve operating means, b. a fluid flow channel is connected from the bridge output connection in the trifurcated junction between the second and third channeled legs to the underside of the movable component in the latter control valve operating means and the upper side of the former control valve operating means, c. a spring biases the movable component in each of the control valve operating means in a direction that urges the operatively connected control valve to close.

14. Control means for fluid flow according to claim 1 in which:

a. a fluid pressure sensing means has a spring-loaded movable component in an enclosure operatively connected to a fluid pressure source, an armature is operatively connected to said movable component, said armature is movable in an impedance coil connected in the sensing leg circuit of said bridge, b. said movable component is operable upon a change in fluid pressure thereby causing said armature to move in said coil, the movement of said armature changes the electrical balance of said bridge and the fluid pressure balance in said cylinder chambers thereby causing said valve elements to move.

15. Control means for fluid flow according to claim 1 in which:

a. a fluid pressure sensing means has a spring-loaded movable component in an enclosure operatively connected to a fluid pressure source, a resistance varying means is operatively connected to said movable component, said resistance varying means is connected in the sensing circuit of said bridge, and b. said movable component is operable upon a change in fluid pressure, thereby modulating a resistance in said resistance varying means, a variation in said resistance causes a change in the electrical balance of said bridge and the fluid pressure balance in said cylinder chambers, thereby causing said valve elements to move.

16. Control means for fluid flow according to claim 6 in which:

a. said valve has a valve body with one inlet and two outlets, a valve seat means is provided between said inlet and each outlet, a fluted seat-closing valve element is in sliding engagement with each valve seat means, each flute in one said seat-closing valve element has a diminishing cross-sectional area along its length, said valve element varying the flow rate of a fluid through said fluted channels, depending on the degree of intrusion of said valve element into said valve seat means, each flute in the other valve element has a cross-sectional area along its length that permits a full fluid flow rate at all degrees of intrusion of the valve element into said valve seat means.

17. Control means for fluid flow according to claim 6 in which:

a. said valve has a body with one fluid flow inlet, one fluid flow outlet, one valve seat means and a valve seat closing element in sliding engagement in said valve seat means, modulating the flow rate of a fluid through said valve inlet, valve seat means, and valve outlet.

18. Control means for fluid flow according to claim 8 in which:

a. each of said valve elements is fluted, each of said flutes is provided with a diminishing cross-sectional area along its length to provide means for varying the flow rate of a fluid through each flute and said valve seat enclosure according to the degree of intrusion of said valve element into a valve seat enclosure, b. fluted channels are between outer surfaces of said seat closing valve element and the inner surface of said valve seat enclosure, each of said fluted channels is provided with a diminishing cross-sectional channel area along its length to provide means for varying the flow rate of a fluid through said channels, the cross-sectional channel area is varied according to the degree of intrusion of said seat closing valve element into said valve seat enclosure.